United States Patent [19]

Mulford et al.

[11] Patent Number: 5,014,314

[45] Date of Patent: May 7, 1991

[54] METHOD FOR DEVELOPING AND TRANSMITTING USAGE CONTEXT INFORMATION IN AN RF COMMUNICATION SYSTEM

[75] Inventors: Keith I. Mulford, Palatine; Paul M. Bocci, Roselle, both of Ill.

[73] Assignee: Motorola, Inc., Schaumburg, Ill.

[21] Appl. No.: 515,399

[22] Filed: Apr. 27, 1990

[51] Int. Cl.$^5$ .............................................. H04L 9/00
[52] U.S. Cl. ......................................... 380/43; 455/33; 455/56; 455/166; 370/95.1
[58] Field of Search ................. 380/9, 43; 455/33, 34, 455/56, 166; 370/95.1

[56] References Cited

U.S. PATENT DOCUMENTS

| | | | |
|---|---|---|---|
| 3,936,609 | 2/1976 | Waldeck | 179/15 |
| 4,411,017 | 10/1983 | Tulbot | 380/9 |
| 4,475,010 | 10/1984 | Huensch et al. | 455/33 |
| 4,573,206 | 2/1986 | Gravel et al. | 455/33 |
| 4,638,476 | 1/1987 | Acampora et al. | 370/83 |
| 4,644,351 | 2/1987 | Zabarsky et al. | 455/33 |
| 4,675,863 | 6/1987 | Paneth et al. | 370/50 |
| 4,684,941 | 8/1987 | Smith et al. | 455/33 |
| 4,713,809 | 12/1987 | Mizota | 370/97 |
| 4,716,407 | 12/1987 | Borras et al. | 340/825 |
| 4,776,037 | 10/1988 | Rozanski, Jr. | 455/166 |
| 4,926,496 | 5/1990 | Cole et al. | 455/34 |

Primary Examiner—Thomas H. Tarcza
Assistant Examiner—David Cain
Attorney, Agent, or Firm—John W. Hayes

[57] ABSTRACT

In an RF communication system, a method for developing and communicating usage context information. When an inbound communication (110) is received from a communication unit (107), a repeater (101) at a base site (100) retransmits the received communication as an outbound signal (114), including usage context information interleaved with the information signal. Communication units are informed of communications of interest occurring over other communication resources without the need for sequential monitoring.

9 Claims, 3 Drawing Sheets

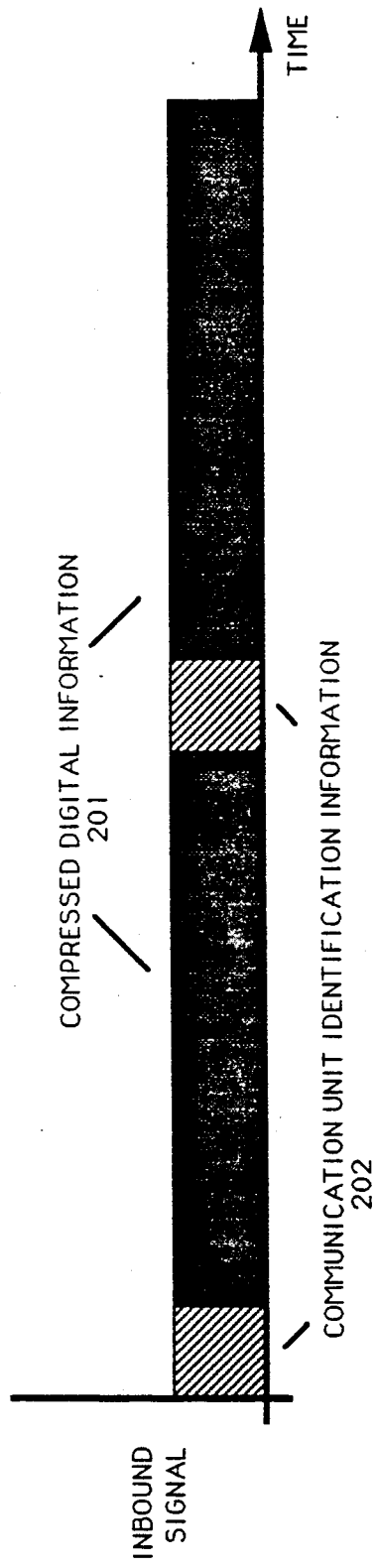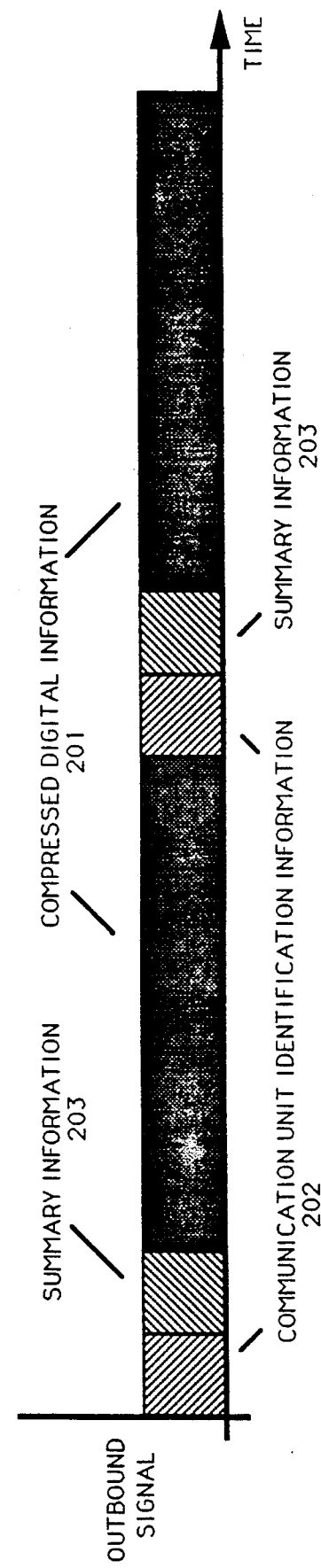

METHOD FOR DEVELOPING AND TRANSMITTING USAGE CONTEXT INFORMATION IN AN RF COMMUNICATION SYSTEM

TECHNICAL FIELD

This invention relates generally to RF communication systems, and, in particular, to a method for developing and transmitting usage context information. It is more particularly directed toward a method for implementing a channel scan function without the need for sequential monitoring of RF communication resources.

BACKGROUND OF THE INVENTION

An RF (Radio Frequency) communication system, designed for conventional dispatch operation, generally includes one or more base sites and a plurality of mobile and portable communication units. In order to serve the needs of a large number of users, the base site is generally equipped with multiple repeater units, where each repeater unit operates over one communication resource. As is well known, a repeater can receive inbound communications over one communication resource, and retransmit the communication using another resource. While the term communication resource is usually understood to refer to an RF channel, the term could also mean a pair of RF channels, in the case of full duplex operation, or TDM (Time Division Multiplex) slots, in the case of a TDM communication system.

Communication units belonging to different companies or organizations are often assigned to different communication resources (or channels) as a convenient method of separation. In cases where the system includes a large number of users and/or the number of communication resources is limited, mobile or portable units belonging to different organizations or companies must share the same communication resource. This is often accomplished through the use of a coded squelch scheme. Coded squelch, as is well known in the art, may be implemented as a nonaudibly transmitted digital or analog signal that uniquely identifies a particular user or group of users within the RF communication system.

Even though individual companies, organizations, or groups of users may be assigned to a particular channel or communication resource, it is often necessary to be able to monitor communications occuring on other communication resources. This requirement is particularly evident in the case of public safety users, such as police departments and fire departments, where units are often grouped by function, such as tactical, surveillance, paramedics, narcotics, etc.

The use of channel scan techniques affords communication system users the opportunity to monitor activity occuring on communication resources other than the one to which an individual unit has been assigned. In prior art channel scan methods, each mobile or portable unit may be programmed to sequentially monitor a predetermined list of communication resources, checking for activity. When activity is detected on a particular communication resource that is being scanned, the scan is halted and the communication unit remains tuned to the particular communication resource until the activity has ended, then resumes its scan operation.

The use of coded squelch systems, as discussed above, makes the channel scan process more complex. When coded squelch is in use, communications of potential interest may be further categorized according to predetermined coded squelch signals. So, in implementing channel scan, a mobile or portable unit will sequentially monitor predetermined communication resources, and upon detecting activity, the mobile or portable unit will determine if the coded squelch signal being transmitted identifies a communication unit or group of communication units of interest. Since it requires processing time to correctly identify a particular coded squelch signal, the use of coded squelch increases the time required for effective channel scan operation.

The use of prior art channel scan techniques creates no insurmountable problems except when a mobile or portable unit utilizing a channel scan function is engaged in conversation. It is generally considered important that channel scan continue even when a mobile or a portable unit is in the process of communicating with another unit so that critical communications occuring over other communication resources are not missed. In the case of a police agency, for example, it may be particularly critical that communication among other groups of police users be closely monitored.

One disturbing effect of conventional channel scan operation during conversation is interruption of receive audio in the current conversation. The scanning communication unit must at least temporarily leave the communication resource over which conversation is occurring, and sequentially monitor the other communication resources of interest. In communication systems where coded squelch is not implemented, the sequential monitoring operation creates only short bursts of noise in the communication unit's receive audio, coincident with a brief monitoring window. However, in coded squelch systems, the burst of noise may be quite lengthy, since identification of particular coded squelch signals requires a considerably longer time than mere identification of activity.

In some instances, most common perhaps in the case of police agencies, communications security is also an important factor. To satisfy this need for communication security, many of the conversations occurring over communication resources within the system will be encrypted to prevent unauthorized listeners from learning the details of police operations. The use of encryption severely complicates the channel scan process. It takes even longer to determine if an encrypted transmission has been encrypted with a particular key (a special code combination allowing a receiver to decrypt encrypted transmissions) than it does to decode a coded squelch signal. This creates an unacceptable interruption of any conversation in which the scanning communication unit is involved. For most encrypted systems, the action of leaving the communication resource over which conversation is occurring, in order to monitor other communication resources, would result in the loss of synchronization information and an unacceptable gap in received information.

Since channel scan is an important and desirable feature of RF communication systems, and the ability to monitor higher priority communications, even while engaged in conversation, may be an essential feature, particularly for police agencies and other public safety users, a need arises for a method of implementing channel scan without causing unacceptable interruptions in the receive audio of conversations in progress during channel scan operation.

SUMMARY OF THE INVENTION

The above-described need is satisfied through the method for developing and communicating usage context information provided by the present invention. According to the invention, in an RF communication system having a plurality of communication resources that provide a capability to communicate information signals among a plurality of communication units, usage context information is developed and communicated by determining usage context information relating to communication units and associated communication resources currently being used to communicate information signals, and retransmitting this usage context information interleaved with the information signals, thus enabling a communication unit to selectively monitor communications involving other communication units matching at least some characteristics embodied in received usage context information.

The term "usage context information" contemplates a variety of identification information relating to both the particular communication units and the associated communication resources being utilized. For example, usage context information comprises individual identification of the communication units currently using the communication resources to communicate information signals, and identification of the communication resources currently being used by the communication units. Sometimes, communication units that are closely associated with one another are further subdivided into talk groups in order to more effectively utilize available communication resources. Communication units within an individual talk group share the same coded squelch code in order to facilitate identification. Thus, talk group identification may be another element of usage context information.

The type of message being communicated may also form a part of the usage context information. Many RF communication systems are designed to permit the communication of voice messages as well as data messages. Communications occurring among various communication units may also be prioritized at various levels, such as normal priority messages and emergency messages. This priority designation may also be included within usage context information. Both voice and data messages may be encrypted to enhance communication security, and in the event that data or voice messages are encrypted, information related to the encryption key being used to encrypt these messages would also be encompassed by the associated usage context information.

In order to conserve valuable bandwidth, voice and data messages communicated in the communication system described above are compressed, and usage context information is transmitted by interleaving usage context frames with information frames.

In one embodiment, the method of the present invention is implemented in an RF communication system that has at least one base site and a plurality of mobile and/or portable communication units, that communicate information signals over a plurality of communication resources. The base site receives a communication from a mobile or portable communication unit, that includes identification of the communication unit as well as information signals. At the base site, usage context information is developed that includes identification of the communication unit and identification of the associated communication resource currently in use, and the base site retransmits at least some of the usage context information interleaved with the information signals. At the mobile or portable communication units, the retransmitted usage context information, interleaved with the information signals, is received, and the usage context information is extracted to form a list of communication unit identifications and their associated communication resources. Since each mobile or portable communication unit has a self-contained list of communication unit identification information that permits each mobile or portable unit to monitor selected communications, the mobile or portable communication units compare communication unit identification information received from the base site with the information in the self contained list, and, if a match is detected, switch to the communication resource associated with the matching communication unit identification.

In order to provide the mobile or portable communication units within the RF communication system with the capability to implement the method described, the individual RF communication units, in addition to transmitter and receiver portions, include a memory for storing the self contained identification information, and a processor which can extract usage context information from received signals, make the proper comparison between extracted identification information and the identification information within the self contained list, and switch to the appropriate communication resource in order to monitor the desired communication.

BRIEF DESCRIPTION OF THE DRAWINGS

FIG. 2a illustrates an inbound communication signal including compressed digital information signals and individual communication unit identification information;

FIG. 2b illustrates an outbound signal from the base site; and

DETAILED DESCRIPTION OF THE INVENTION

Figure 1:
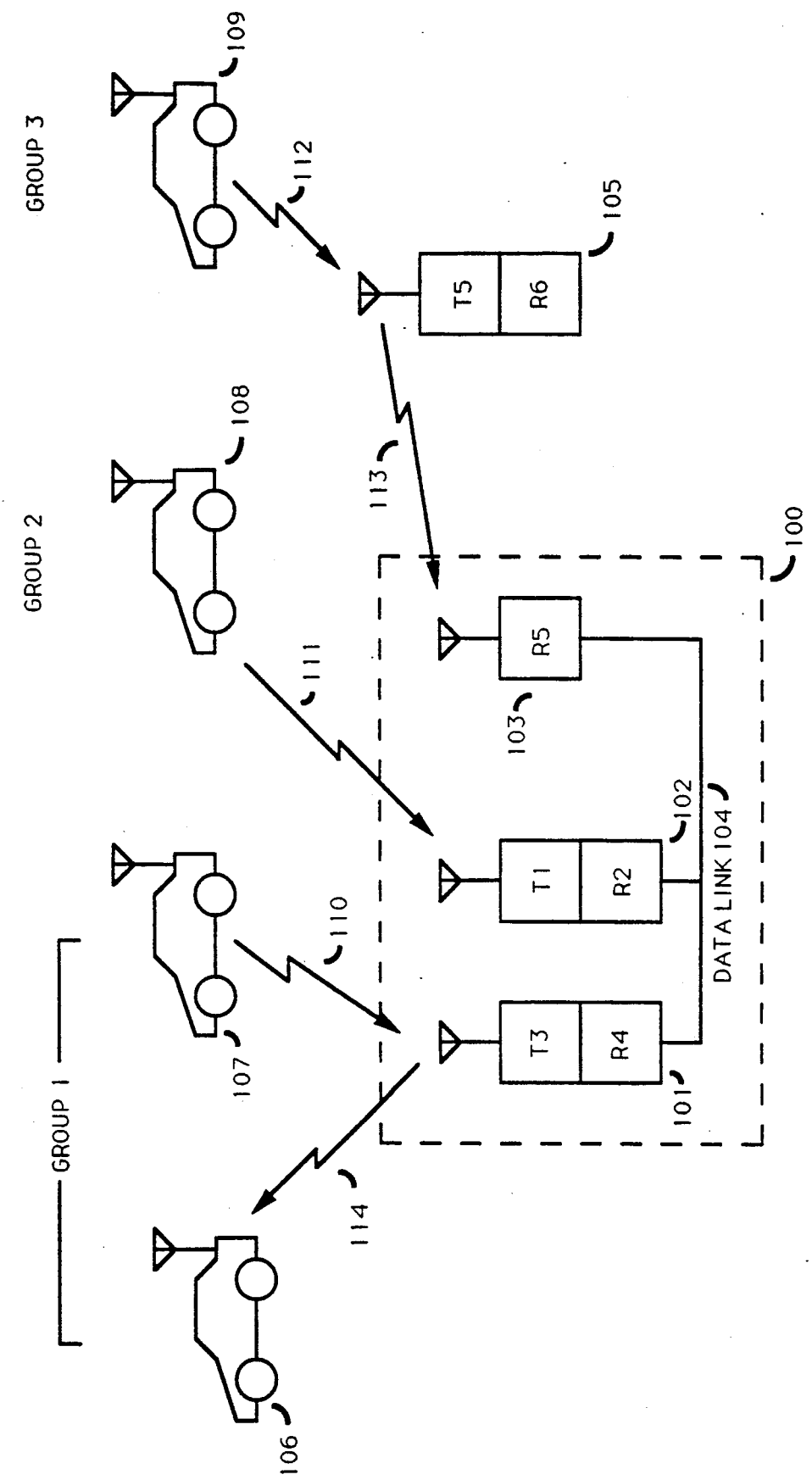
FIG. 1 depicts an RF communication system having a base site and a plurality of mobile communication units.

FIG. 1 illustrates an RF communication system having a base site (100) and a plurality of mobile communication units (106-109). Although portable communication units may also be used within the RF communication system, no portable units are shown in the figure for the sake of conciseness. The base site (100) includes a plurality of repeaters (101 and 102). The repeaters (101 and 102) at the base site (100) have the capability to receive communications from the communication units and to retransmit these communications. This retransmission greatly increases the effective range of mobile or portable communication units within the system.

Sometimes, because of unusual terrain features, or because of the size of a given coverage area, a remote site (105) will be required. This remote site (105) affords coverage to communication units that may find themselves beyond the range of the base site's communication capability. In order to monitor communications occurring between the remote site (105) and other communication units, the base site (100) includes a monitor receiver (103) that effectively monitors remote site communications. Of course, the base site may include a large number of repeaters, and there may be more than one remote site and associated monitor receivers within the base site; the numbers of these units have been limited in the figure for simplicity. All of the repeaters (101 and 102) and monitor receivers (103) are interconnected at the base site (100) via a data link (104) in accordance with well-understood prior art. As indicated in the figure, one repeater (102) receives over communication resource 2 (R2) and retransmits over communication resource 1 (T1), while a second repeater (101) receives over communication resource 4 (R4) and retransmits over resource 3 (T3). The remote site (105) receives communications over resource 6 (R6) and retransmits over resource 5 (T5), so the monitor receiver (103) at the base site (100) is designed to receive communications over communication resource 5 (R5).

When a communication unit (107) that is assigned (for example) to group 1 initiates a communication (110), the communication signal (110) is received by a repeater (101) and retransmitted as an outbound signal (114). The structure of the inbound communication signal (110) is illustrated in FIG. 2a. Interleaved with compressed digital information (201), which could be either data or voice, is communication unit identification information (202) associated with the initiating communication unit (107). The identification information (202) transmitted by the communication unit (107) may include individual unit identification, talk group identification, message type, message priority or, in the event of an encrypted transmission, information related to the encryption key currently in use. The repeater (101) develops usage context information, which includes not only individual communication unit identification, but information identifying the associated communication resource, and retransmits this information interleaved with the compressed digital information signals received from the mobile unit (107). In addition, the repeater (101), by virtue of the data link (104), has already been informed of the nature of communications occurring over other communication resources. So the repeater (101) develops usage context information relating to other communications, and retransmits this information as summary information (203) (FIG. 2b) interleaved with the compressed digital information signals (201). For the scenario depicted in FIG. 1, another communication unit (106) belonging to group 1 that receives the outbound signal (114) from the repeater (101) would receive a complete summary of communication occurring over other communication resources.

A communication unit (108) from group 2 is illustrated in FIG. 1 as transmitting an inbound signal (111) to another repeater (102) at the base site (100). In addition, a group 3 communication unit (109) is shown transmitting an inbound signal (112) to the remote site (105). This communication is detected by the monitor receiver (103), and usage context information is provided to the first repeater (101) over the data link (104). Thus, the summary information (203) shown in the illustration of the outbound signal in FIG. 2b provides the communication units within the system with a concise and accurate usage context summary of all communication occurring within the system, without the need for the communication units to sequentially monitor communication resources other than the ones they are currently using.

Figure 3:
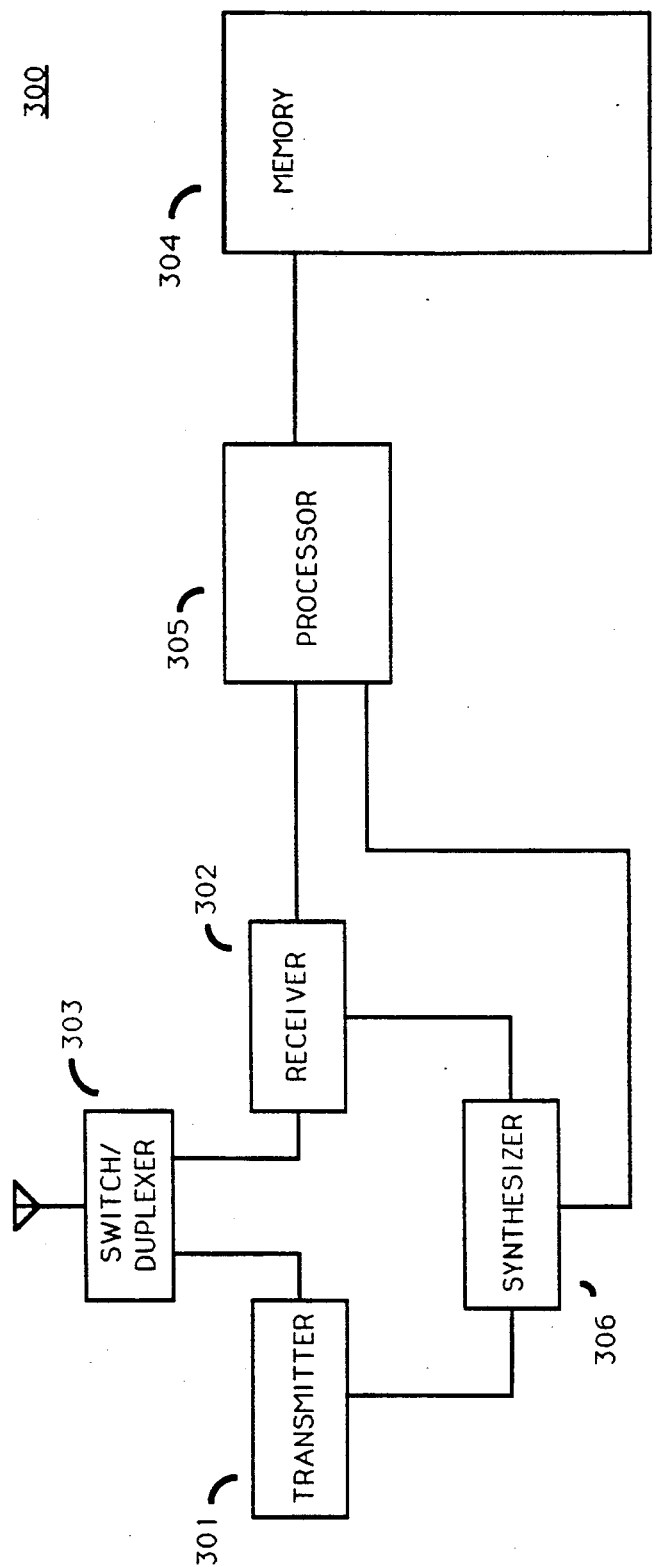
FIG. 3 is a block diagram representation of a mobile or portable communication unit designed to implement a method in accordance with the present invention.

FIG. 3 is a block diagram representation of a mobile or portable communication unit constructed and arranged to operate in a communication system utilizing the method herein described. The communication unit, as generally depicted by the number 300, includes a transmitter (301) and receiver (302). The communication unit (300) includes a transmit/receive switch (303) to isolate the receiver (302) from the transmitter (301) during transmit operation. Of course, the transmit/receive switch (303) may be replaced by a duplexer, as is well known in the art, in the event that full duplex communication must be supported. The communication unit (300) includes a synthesizer (306) which ensures that the transmitter (301) and receiver (302) are operating over the correct communication resource. A processor (305) extracts usage context information from signals received by the receiver (302) and creates a list of communication unit identifications and associated communication resources which it stores temporarily in a memory (304). This list is updated periodically whenever new usage context information is received. The memory (304) is also used to store a predetermined self-contained list of communication unit identification information that allows the communication unit (300) to search for communications of interest. Whenever a match is detected between an entry in the self-contained list and the list created from received usage context information, the processor (305) causes the synthesizer (306) to switch to the communication resource associated with the matching communication unit identification so that communications of interest may be monitored.

What is claimed is:

1. In an RF communication system having a plurality of communication resources that provide a capability to communicate information signals among a plurality of communication units, a method for developing and communicating usage context information, the method comprising the steps of:
    (a) determinig usage context information relating to communication units and associated communication resources currently being used to communicate information signals; and
    (b) retransmitting, over at least one communication resource, the usage context information determined in step (a), interleaved with the information signals, thus enabling a communication unit to selectively monitor communications involving other communication units matching at least one characteristic embodied in received usage context information.

2. The method in accordance with claim 1, wherein the usage context information determined in step (a) comprises:
    (a1) individual identification of the communication units currently using the communication resources to communicate information signals; and
    (a2) identification of the communication resources currently being used by the communication units identified in step (a1).

3. The method in accordance with claim 2, wherein the usage context information further comprises talk group identification of the communication units.

4. The method in accordance with claim 2, wherein the usage context information further comprises message type of the information signals.

5. The method in accordance with claim 2, wherein the usage context information further comprises message priority of the information signals.

6. The method in accordance with claim 2, wherein the information signals are encrypted, and the usage context information further comprises information related to an encryption key in use.

7. The method in accordance with claim 1, wherein the step (b) of retransmitting usage context information interleaved with the information signals comprises continuously interleaving usage context frames with information frames.

8. In an RF communication system having at least one base site and a plurality of mobile and/or portable communication units constructed and arranged to communicate information signals over a plurality of communication resources, a method allowing communication units to obtain usage context information relating to the communication resources and/or other communication units, the method comprising the steps of:

at the base site:
(a) receiving a communication from a mobile or portable communication unit, the communication including identification of the communication unit and information signals;
(b) developing usage context information including identification of the communication unit and identification of the communication resource currently in use;
(c) retransmitting at least some of the usage context information interleaved with the information signals;

at the mobile or portable communication units:
(d) receiving the retransmitted usage context information interleaved with the information signals to provide a received signal;
(e) extracting the usage context information from the received signal to form a list of communication unit identifications and associated communication resources;
(f) comparing the list formed in step (e) with a self-contained list of communication unit identification information to determine if a match exists between communication unit identifications in said lists; and, if so
(g) switching to the communication resource associated with the matching communication unit identification.

9. An RF communication unit constructed and arranged to transmit and receive signals over a plurality of communication resources, wherein at least some of the signals include usage context information associating other communication units with particular communication resources, the RF communication unit comprising:

transmitter means for transmitting signals;
receiver means for receiving signals;
storage means for storing identification information related to other communication units;
means for extracting usage context information from received signals to form a list of communication unit identifications and associated communication resources;
comparison means for comparing the list of communication unit identifications with the identification information from the storage means;
switching means, responsive to the comparison means, for switching to the communication resource associated with the matching communication unit identification.

* * * * *